US012661751B2

(12) United States Patent (10) Patent No.: US 12,661,751 B2
Maurer (45) Date of Patent: Jun. 23, 2026

(54) CHUCK

(71) Applicant: SMW-Autoblok Spannsysteme GmbH, Meckenbeuren (DE)

(72) Inventor: Eckhard Maurer, Oberteuringen (DE)

(73) Assignee: SMW-Autoblok Spannsysteme GmbH, Meckenbeuren (DE)

( * ) Notice: Subject to any disclaimer, the term of this patent is extended or adjusted under 35 U.S.C. 154(b) by 661 days.

(21) Appl. No.: 17/942,741

(22) Filed: Sep. 12, 2022

(65) Prior Publication Data

US 2023/0088695 A1      Mar. 23, 2023

(30) Foreign Application Priority Data

Sep. 13, 2021    (EP) .................................... 21196223

(51) Int. Cl.
B23Q 17/00          (2006.01)
B23B 31/16          (2006.01)
(52) U.S. Cl.
CPC ........ B23Q 17/006 (2013.01); B23B 31/1627 (2013.01); *B23B 2260/128* (2013.01)
(58) Field of Classification Search
CPC .............. B23Q 17/006; B23B 31/1627; B23B 2260/128; B23B 2231/26; B23B 2231/52; B23B 2270/48
See application file for complete search history.

(56) References Cited

U.S. PATENT DOCUMENTS

| | | | |
|---|---|---|---|
| 6,257,077 B1 | 7/2001 | Patterson | |
| 2009/0090014 A1* | 4/2009 | Wisniewski ............ | B23B 31/30 33/626 |
| 2016/0164305 A1* | 6/2016 | Maurer ................... | B23B 31/28 320/108 |

FOREIGN PATENT DOCUMENTS

| | | |
|---|---|---|
| DE | 202008002735 | 5/2008 |
| DE | 10 2007 048 121 | 4/2009 |

(Continued)

*Primary Examiner* — Sunil K Singh
(74) *Attorney, Agent, or Firm* — Collard & Roe, P.C.

(57)                ABSTRACT

In the case of a clamping device (1) for holding a workpiece (3) to be machined by a machine tool (2), which is used in particular as a clamping chuck, vice or zero point clamping system, consisting of a housing (4), a supporting element (6), which is a component of the housing (4) or is fastened thereto, and thereby forms a supporting surface (6'), on which the respective workpiece (3) rests during the machining process, at least one clamping jaw (7) that is mounted in the housing (4) so it is axially movable and a counter-stop formed by the housing (4) or an axially movable clamping jaw (8), between which the workpiece (3) is clamped in the region of the supporting surface (6') or at least three clamping jaws (7, 8, 9) mounted in the housing (4) so they are axially movable, between which the workpiece (3) is clamped in the region of the supporting surface (6'), a reliable and verifiable monitoring of the distance between the workpiece (3) and the supporting surface (6') and/or the clamping jaws (7, 8, 9) is supposed to take place at the clamping device (1) before and during the entire machining process, without extensive constructional measures being required for this. This is achieved in that at least one free space (11) is integrated in the housing (4), the axis of symmetry of which runs perpendicular to the supporting surface (6') and which faces the clamped workpiece (3) with the open front side, and/or that at least one free space (11) is integrated in one of the clamping jaws (7, 8, 9), which free space leads to the respective clamping surface (7', 8', 9') of the clamping jaws (7, 8, 9), that a proximity sensor (12) is inserted in the respective free space (11), that, via the proximity sensor (12), a monitoring area (13) is formed between the supporting surface (6') and the workpiece (3), which is monitored by an analysis unit (14) with respect to the presence of the workpiece (3).

9 Claims, 6 Drawing Sheets

(56) References Cited

FOREIGN PATENT DOCUMENTS

| DE | 10 2008 052 809 | 4/2010 | |
| DE | 20 2010 001 139 | 6/2010 | |
| DE | 10 2017 213 400 | 2/2019 | |
| EP | 3 266 546 | 1/2018 | |
| EP | 3 391 991 | 10/2018 | |
| EP | 3 578 294 | 12/2019 | |
| WO | WO-2020212132 A1 * | 10/2020 | ....... B23B 31/16279 |

* cited by examiner

CHUCK

REFERENCE TO PENDING PRIOR PATENT APPLICATION

This patent application claims benefit of European Patent Application No. 21 196 223.8, filed Sep. 13, 2021, which patent application is hereby incorporated herein by reference.

FIELD OF THE INVENTION

The invention relates to a clamping device for holding a workpiece to be machined by a machine tool, which is used in particular as a clamping chuck, vice or zero point clamping system, according to the preamble of Patent claim 1.

BACKGROUND OF THE INVENTION

This type of clamping device is already previously known from DE 10 2007 048 121 A1. In addition, reference must be made to the following documents: U.S. Pat. No. 6,257,077 B1, DE 10 2008 052 809 A1. EP 3 391 991 A1, EP 3 578 294 A1, EP 3 266 546 A1, DE 10 2017 213 400 A1 and DE 20 2010 001 139 U1.

These types of clamping devices can be designed as vices having one or two mutually advanceable and thus movably mounted clamping jaws, between which the workpiece is clamped in a stationary position during the machining process. However, these types of clamping devices can also be designed as a clamping chuck with at least three radially advanceable clamping jaws, in order to accommodate the workpiece between said clamping jaws and to hold the workpiece in a specific position during the machining process of the machine tool.

Frequently, these types of clamping devices are arranged at so-called machining centers and are used together with a zero point clamping system on a pallet or a tool table. Because of the zero point clamping system, it is possible for the clamping device together with the workpiece to be mounted at exactly the identical predetermined position during replacement. This means that exchanging the clamping device with a clamped-in workpiece does not require any new positioning calibrations.

The pallets or tool tables are put into rotation during the machining process. Therefore, considerable centrifugal forces act on the rotating workpiece and the clamping device during the machining process.

Therefore, it is necessary to monitor the exact position of the workpiece with respect to the clamping device both when mounting the workpiece on the clamping device as well as during the entire machining process.

Performing these types of monitoring processes by means of a medium, in particular air or gases, has been known for a long time. In this case, it is required that the medium is guided out of a stationary state into the rotating clamping device. Consequently, a coupling unit or an adapter must be provided at the transitional area between the stationary provisioning device of the medium and the rotating clamping device, through which the rotational movement of the clamping device is balanced out. In addition, the medium must be adjusted with a constant pressure in the respective borehole integrated in the housing of the clamping device, because the pressurized air is supposed to escape at the supporting surface, i.e., between the housing upper side of the clamping device and the respectively clamped workpiece.

The air gap between the supporting surface of the clamping device and the lower side of the workpiece facing the housing of the clamping device is consequently a measure for the pressures prevailing there. If namely the distance between the supporting surface and the workpiece is in the tolerance range, for example 0.02 mm, then a known pressurized state prevails, which shows that the distance between the workpiece and the housing is correct or is in the tolerance range. As soon as foreign particles, for example chips or other impurities, or a reduction in the required clamping force of the clamping jaws cause a change in position of the workpiece before or during the machining process, an increased air gap develops between the workpiece and the supporting surface of the clamping device, through which air gap the medium can escape. This leads to a pressure reduction in the area of the transition between the supporting surface and the workpiece. This drop in pressure is measurable and therefore supplies information that the position of the workpiece is no longer correct.

It has turned out to be disadvantageous in the case of these known monitoring devices for clamping devices that a considerable constructive effort is required in order to transport the medium from a stationary environment into the rotating environment of the clamping device and in particular at the transitional area between the supporting surface and the workpiece. Here it is of technically decisive importance that the medium is available uniformly and over during the entire duration of the machining process and is pressed in at the desired exit point, i.e., between the supporting surface and the workpiece, with a constant pressurized state and escapes there with a predetermined pressure.

These types of technically induced requirements inevitably lead to a considerable constructive and cost-intensive effort.

In addition, the disadvantage of these type of mechanically operated monitoring measures is that the measured values must be transmitted to an external analysis device. The drop in pressure occurs namely directly in the transitional area between the workpiece and the supporting surface of the clamping device, but the measured values must first be recorded in a pressurized state and can only be converted into a digital switching signal with the aid of a corresponding electrical structural unit. Therefore, in the case of a correspondingly negative change in the distance between the workpiece and the supporting surface, a deviation from the tolerance range cannot be transmitted immediately to another electrical device, for example the machine tool, so that it can be turned off immediately.

SUMMARY OF THE INVENTION

Therefore, the object of the invention is to make available a clamping device of the type cited at the outset, in which a reliable and verifiable monitoring of the distance between the workpiece and the supporting surface and/or the clamping jaws of the clamping device takes place before and during the entire machining process, without extensive constructional measures being required for this. At the same time, the determined measuring results with respect to the distance between the workpiece and the supporting surface of the clamping device are supposed to be generated digitally and therefore be immediately analyzable and consequently can be used as a switching signal.

Due to the fact that at least one free space is integrated in the housing, the axis of symmetry of which runs perpendicular to the supporting surface and which faces the clamped workpiece with the open front side, and/or that at least one free space is integrated in one of the clamping jaws, which free space leads to the respective clamping surface of the clamping jaws, that a proximity sensor is inserted in the respective free space, that, via the proximity sensor, a monitoring area is formed between the supporting surface and the workpiece, which is monitored by an analysis unit with respect to the presence of the workpiece, the position of the workpiece is monitored during insertion, during the clamping process, and during the entire machining process of the machine tool and as soon as the distance of the workpiece to the supporting surface as a reference plane changes out of a predetermined tolerance range, the analysis unit immediately determines this and generates an electrical or digital switching signal, by means of which the machine tool can be stopped without a time delay.

In addition, it is especially advantageous that no medium must be transported into the rotating housing of the clamping device. Therefore, all coupling adaptors between the stationary pressure generation and the rotating housing of the clamping device are eliminated, thereby creating a free space on the machine tool, on the one hand, and, on the other hand, these types of media can be eliminated completely. This reduces the manufacturing costs significantly.

The energy required for the operation of the inductively operated proximity sensor can be made available in the process via electric lines. At the same time, data or signals can be transmitted through these electric lines to the analysis unit and from there to the machine tool or other electrical control devices.

It is readily conceivable to replace the electric lines with an inductively operated interface so that the analysis unit can be arranged both inside of the housing of the clamping device as well as outside.

The drawings depict three clamping devices for various applications in clamping technology, which are explained in greater detail in the following. In detail, the following shows:

DETAILED DESCRIPTION OF THE PREFERRED EMBODIMENTS

Figure 1:
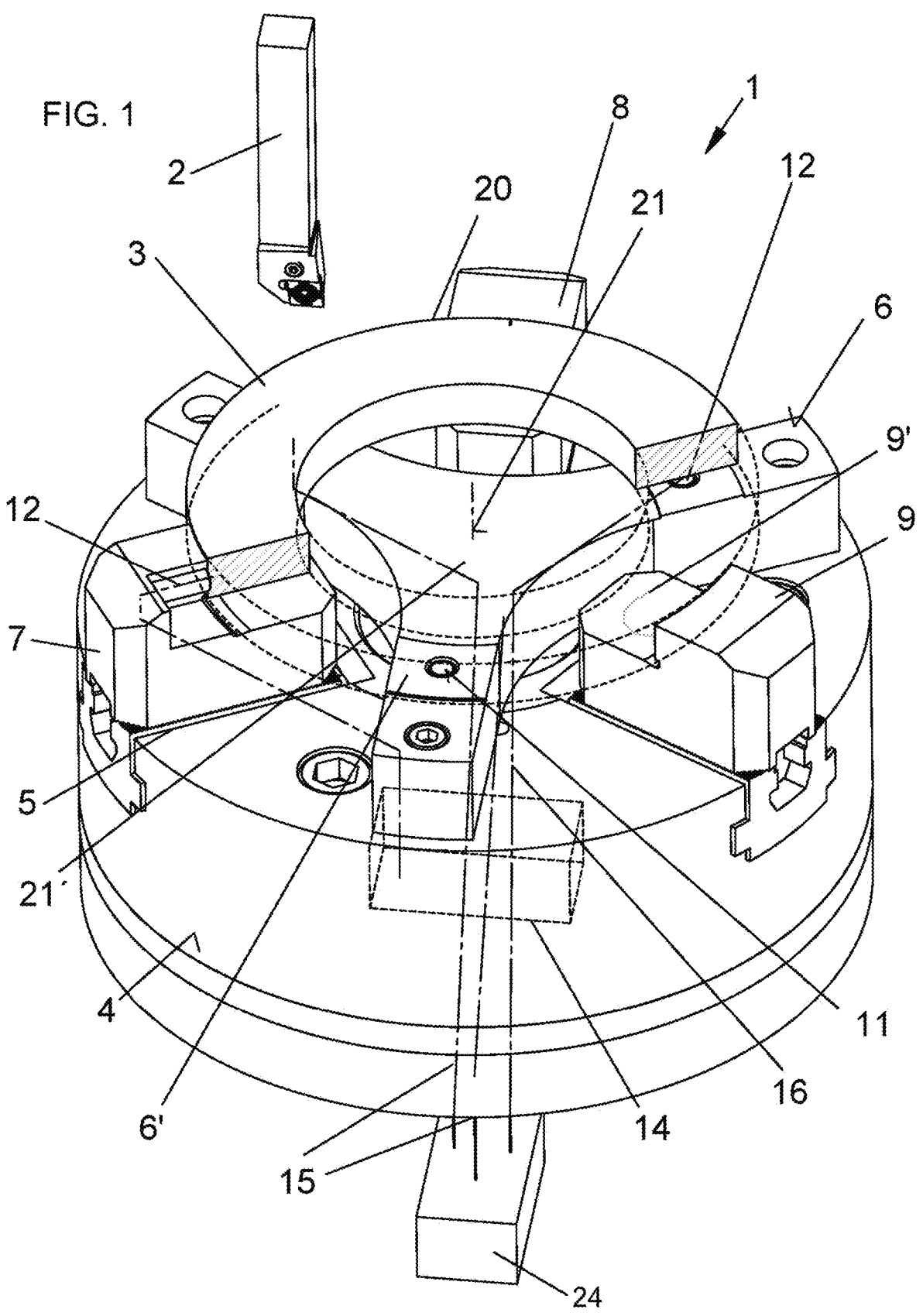
FIG. 1A perspective view of a clamping device as a clamping chuck with a housing, on which a supporting element for holding a workpiece is mounted and three clamping jaws mounted in the housing so they are axially movable, between which the workpiece is to be clamped, FIG. 2A section of the clamping devices[1] according to FIG. 1 with an optimally clamped workpiece, FIG. 3 The clamping device according to FIG. 1 an incorrectly inserted workpiece, FIGS. 4a and 4b A perspective view of a clamping device as a zero point clamping system with a housing, by means of which a ring-shaped supporting surface for holding a workpiece is formed and three clamping jaws mounted in the housing so they can move axially, between which the workpiece is to be clamped for centering, and FIG. 5A clamping device as a vice with a housing, in which two opposing clamping jaws axial are moveably arranged for holding a workpiece and between which the workpiece to be machined is held.
Figure 2:
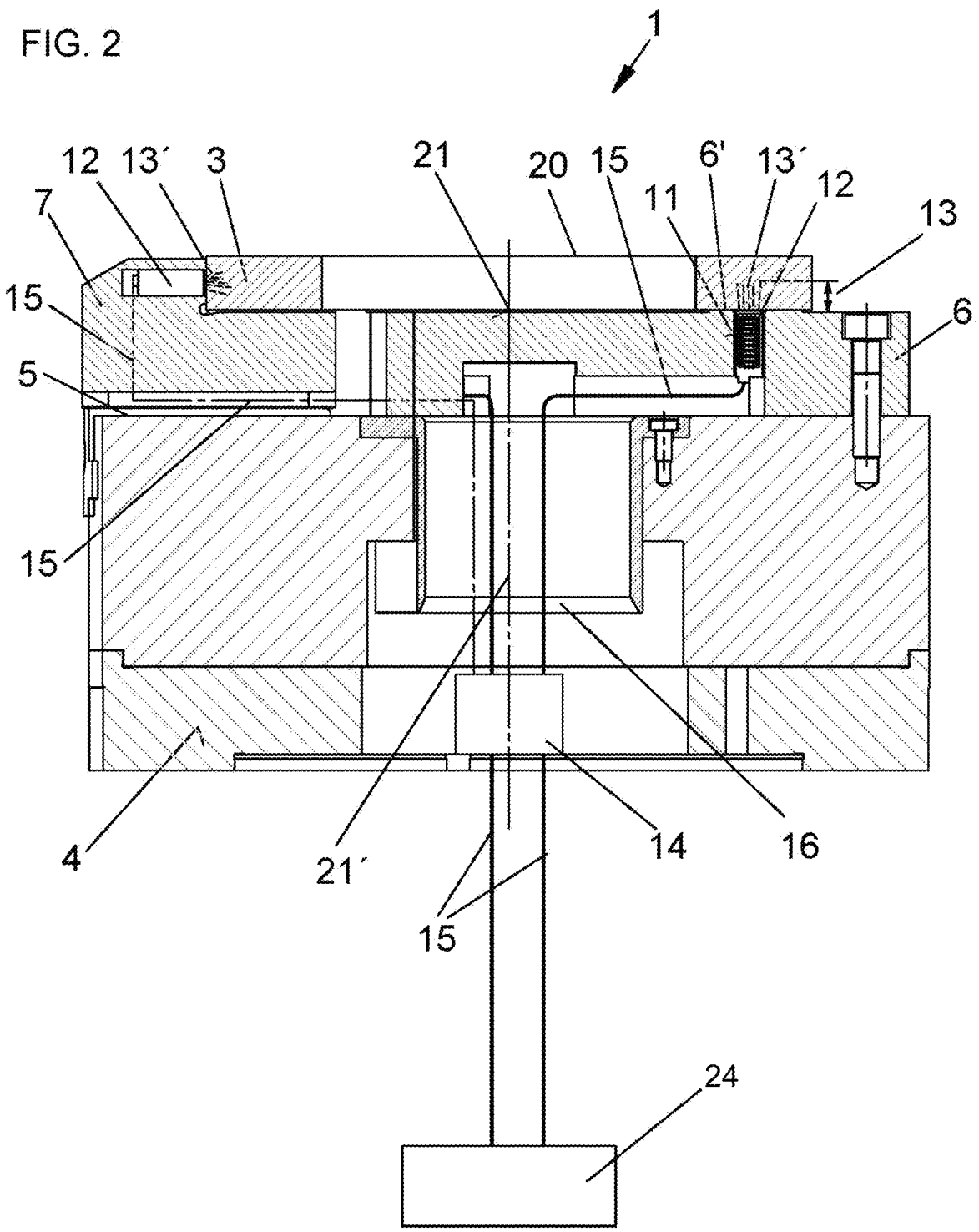
Figure 3:
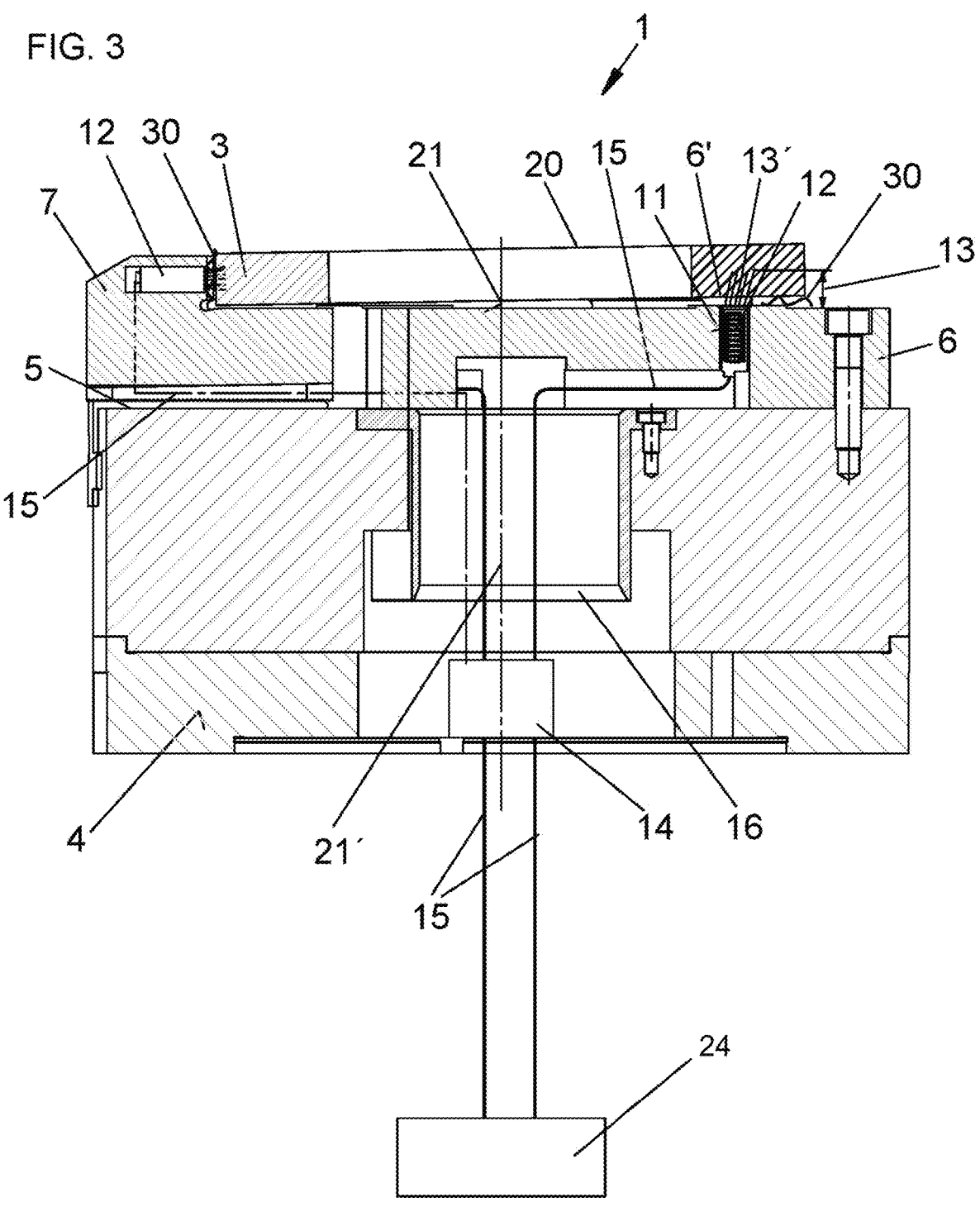

FIGS. 1, 2, and 3 show a clamping device 1, which is arranged in the region of a machine tool 2. A workpiece 3 to be machined by the machine tool 2 is meant to be held in a specific position by means of the clamping device 1, so that the corresponding machining processes can be carried out by the machine tool 2. Because the individual machining steps of the machine tool 2 are supposed to be carried out with error tolerances that are as low as possible, the position of the clamped workpiece 3 must be monitored both during insertion into the clamping device 1 as well as during the entire machining process of the machine tool 2.

The clamping device 1 thereby consists of a housing 4, which is normally put into rotation during the machining process of the machine tool 2. Integrated into the housing 4 are three guide grooves 5, which run radially, i.e., are positioned in the direction of a center point 21 of the housing 4.

One of the three clamping jaws 7, 8 or 9 is inserted into the respective guide groove 5 so that it is mounted in an axially movable manner. The clamping jaws 7, 8 and 9 can be driven thereby hydraulically, electrically or mechanically by an appropriate power means, which is arranged in the interior of the housing 4 and is not depicted. When the workpiece 3 is removed, the clamping jaws 7, 8 and 9 consequently move synchronously outwardly and when a new workpiece 3 to be machined must be inserted into the clamping device 1, the three clamping jaws 7, 8 and 9 are synchronously advanced in the direction of the outer circumference of the workpiece 3, and namely long enough until the clamping jaws 7, 8 and 9 come into operative contact with the workpiece 3 and exert a corresponding predetermined holding force on said workpiece.

In addition, a supporting element 6 is fastened to the housing 4, which supporting element features three arms projecting from the center point 21, through which a supporting surface 6' is formed, on which the respective workpiece 3 rests. Therefore, the supporting surface 6' supports the workpiece 3 in one direction. The three clamping jaws 7, 8 and 9 center and clamp the workpiece 3 parallel to the reference plane formed by the supporting surface 6'. Therefore, the workpiece 3 is kept centered in the space, as soon as the clamping jaws 7, 8 and 9 are advanced.

In order to now monitor the position of the workpiece 3 in relation to the supporting surface 6', three boreholes 11, which are arranged offset from each other and run perpendicular to the supporting surface 6' and are open in the direction of the workpiece 3 to be clamped, are first integrated in the housing 4.

An inductively operated proximity sensor 12 is inserted into the respective borehole 11, and namely in such a way that the outer contour formed by the proximity sensor 12 runs somewhat beneath the supporting surface 6'. Consequently, there is an air gap of 0.02 mm, for example, between the workpiece 3 to be clamped and the respective proximity sensor 12. Even if the workpiece 3 is resting fully on the supporting surface 6', the predetermined air gap is present between the proximity sensors 12 and the workpiece 3.

FIG. 1 also shows that the three clamping jaws 7, 8 and 9 are arranged in a separation angle of 120° and that the three boreholes 11 run between two adjacent clamping jaws 7, 8 or 9. Consequently, the boreholes 11 are also arranged in a separation angle of 120° so that the position of the workpiece 3 during insertion and during the entire machining process is monitored by the proximity sensors 12 inserted into the boreholes 11.

FIG. 2 shows that the workpiece 3 rests correctly on the supporting surface 6' and is uniformly locked by the clamping jaws 7, 8 and 9. Consequently, the distance between the lower side of the workpiece 3 and the upper side of the supporting surface 6' is identical over the entire plane of the supporting surface 6'. A monitoring area 13, which is indicated schematically, is formed by the respective proximity sensors 12. In this case, the monitoring area 13 extends over a distance of 0.02 mm to 3 mm. The distance of the monitoring area 13 is accordingly sufficient to determine the desired distance between the workpiece 3 and the supporting surface 6' by means of the proximity sensors 12. The monitoring area 13 is thereby formed by the schematically indicated field lines 13', which hit on the lower side of the workpiece 3. Therefore, the respective proximity sensor 12 is able to permanently monitor the distance between this and the clamped workpiece 3.

In FIG. 3, chips 30 are provided between the supporting surface 6' and the workpiece 3, by means of which the position of the workpiece 3 is improperly changed.

The boreholes 11 can be integrated in slides or other movably mounted components in order to be able to change the position thereof in relation to the center point 21 of the housing 4. Since particularly the diameter of the workpiece 3 to be machined increases or decreases, the proximity sensor 12 and consequently the borehole 11 must be adapted to the diameter of the workpiece 3.

The respective proximity sensor 12 is attached to an analysis unit 14 by means of an electric line 15. The measurement data determined by the respective proximity sensors 12 with respect to the presence of the workpiece 3 is therefore transmitted electrically to the analysis unit 14 through the electric lines 15. The analysis unit 14 is connected to the machine tool 2 or the control device 24 thereof via additional electric lines 15. Consequently, changes in the distance between the respective proximity sensor 12 and the workpiece 3 can be transmitted immediately to the analysis unit 14 and therefrom to the machine tool 2 for emergency shut-down thereof. This status is reflected for example in FIG. 3, since the workpiece 3 is inserted there in an askew manner, so that the air gap or the distance between said workpiece and the depicted proximity sensors 12 is greater than the predetermined tolerance range allows. When specifically the distance between the workpiece 3 and the supporting surface 6' increases by more than 0.02 mm, the workpiece 3 is outside of the predetermined tolerance field. In addition, a change in the distance during the machining process shows that, due to the rotational forces that are occurring, the workpiece 3 is displaced from the safe holding position between the clamping jaws 7, 8 and 9. These types of displacements of the workpiece 3 however can lead to said workpiece becoming completely disengaged from the locking of the clamping device 1. As a result, for safety reasons, the machine tool 2 must be turned off immediately and the machining process must be terminated for safety reasons.

The electric lines 15 in this case are bundled in the region of the axis of symmetry 21' of the housing 4, which runs aligned to the center point 21. The lines 15 can be replaced by an inductively operated interface 16 so that the communication between the proximity sensors 12 and the analysis unit 14 is operated inductively. In the process, the analysis unit 14 can readily be arranged in the interior of the housing 4 or outside, in other words, in the stationary environment.

In the described and depicted exemplary embodiment, a clamping chuck with the three clamping jaws 7, 8 and 9 is selected as the clamping device 1 according to the invention. Of course, several of the clamping jaws 7, 8, 9 can also be used on these types of clamping devices 1 and the number of boreholes 11 can be arranged over the supporting surface 6' around the depicted circular path 20. The circular path 20 features a predetermined radius and the center point of the circular path 20 is the center point 21 of the housing 4. Of course, any number of boreholes 11 with a different distance from the center point 21 can be provided.

It is also readily possible to retrofit existing clamping devices 1 with the proximity sensors 12 according to the invention, because the respective required boreholes 11 can also be subsequently integrated into the housing 4. The insertion and operation of the proximity sensors 12 via the electric lines 15 and the analysis unit 14 can be retrofitted in the process.

Figure 4A:
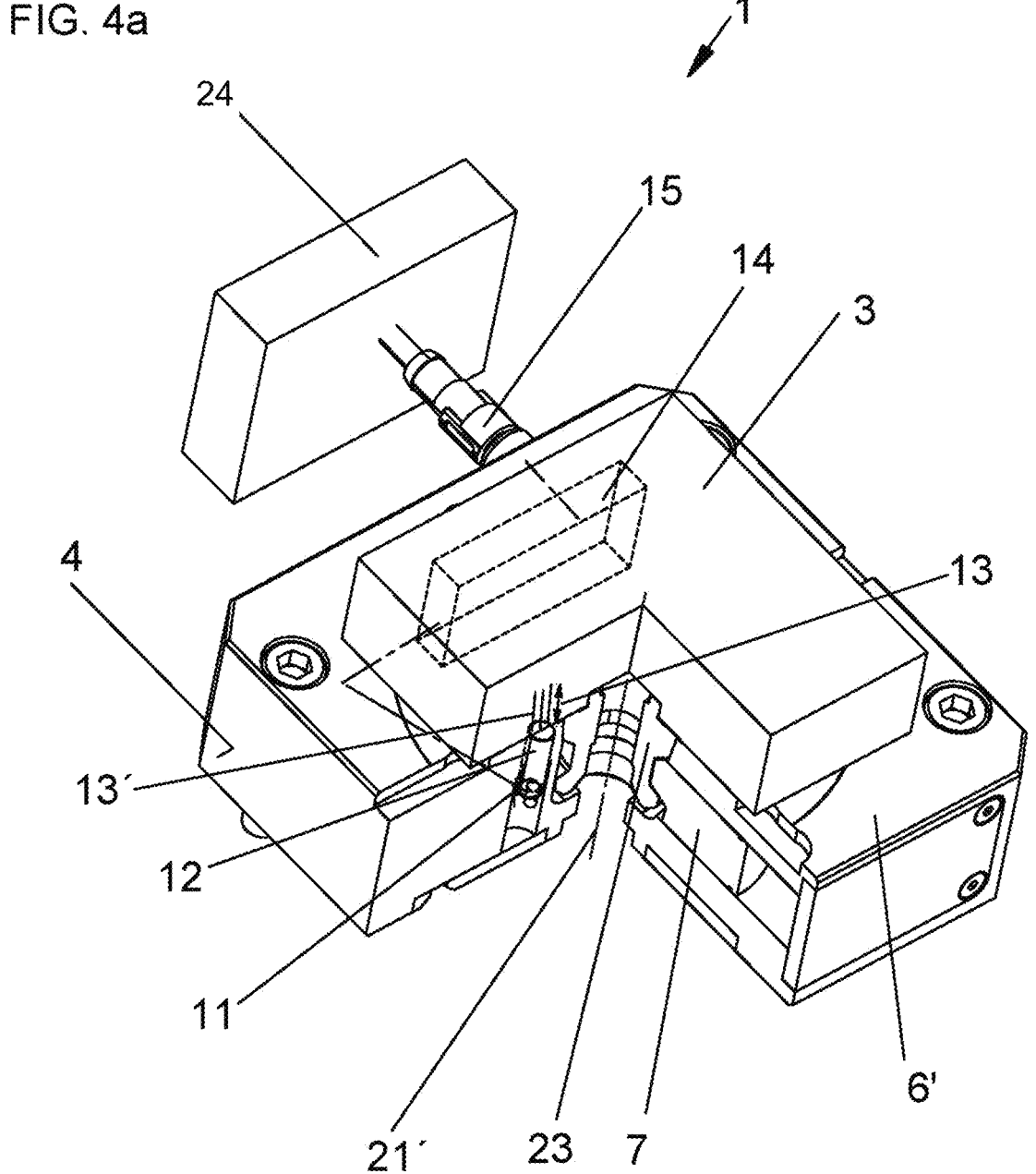
Figure 4B:
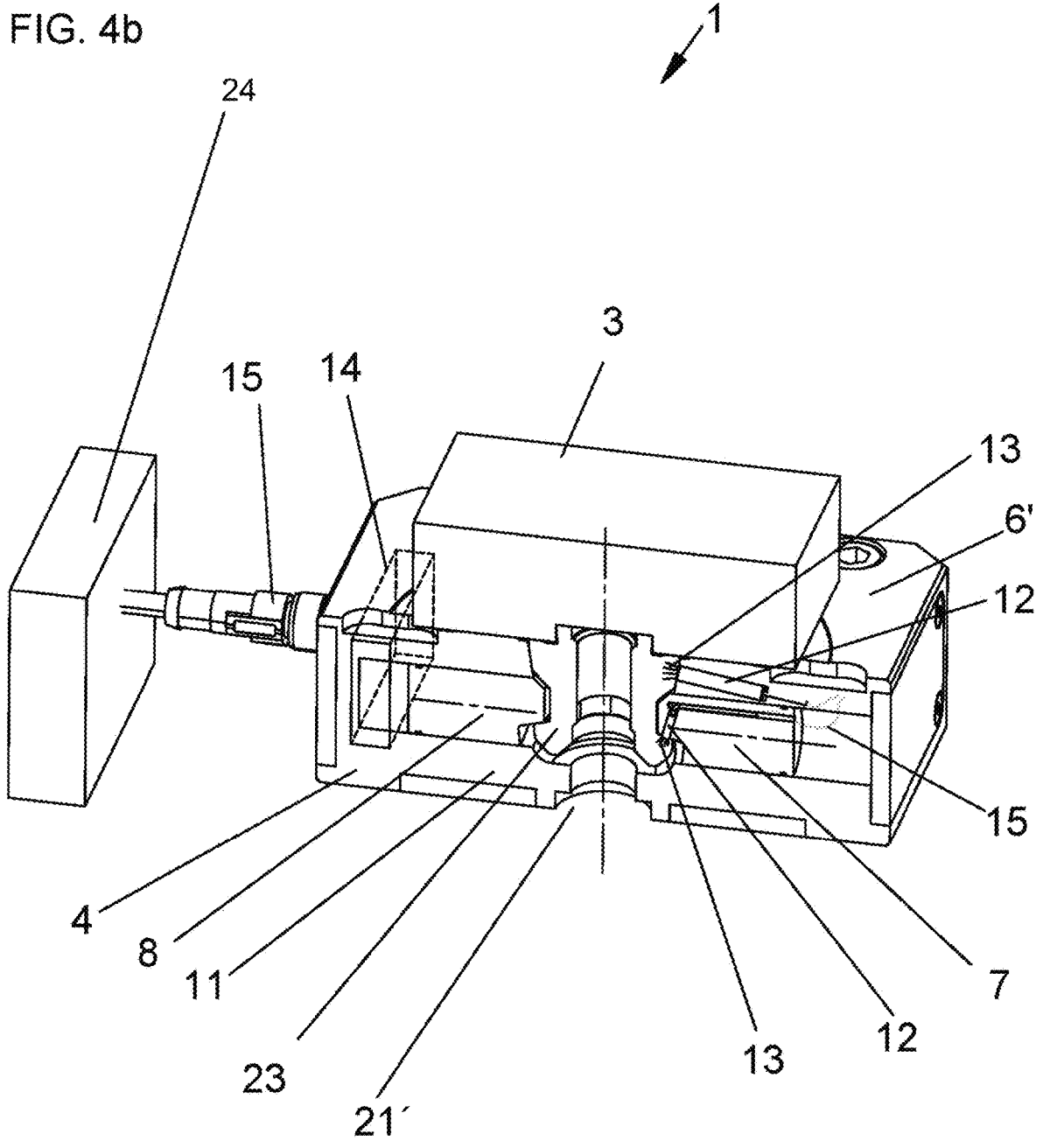

In FIGS. 4a and 4b, the clamping device 1 is designed and used as a so-called zero point clamping system. Basically, a zero point clamping system 1 is distinguished by means of this system by a clamping bolt on which the workpiece 3 is fastened or the workpiece 3 is kept directly centered in the space. In the case of known zero point clamping systems, specifically the workpiece 3 is supposed to be arranged with reproducible accuracy on a pallet or a tool table of the machine tool 2 during the machining process of identical workpieces 3. Consequently, the zero point clamping system 1 specifies the exact reference for the machining processes to be carried out by the machine tool 2, because every exchanged workpiece 3 is supposed to correspond as exactly as possible to the previous position of structurally identical workpieces 3.

A clamping bolt 23 bearing the workpiece or the workpiece 3 is pulled, on the one hand, by the three clamping jaws 7, 8, 9 mounted in the housing 4 so they are axially movable into the interior of the housing 4 and, on the other hand, the three synchronously mutually advanceable clamping jaws 7, 8, 9 lock the workpiece 3 in such a way that it is centered, so that its position corresponds as much as possible with an extremely low error tolerance to the previous or subsequent position of structurally identical workpieces 3. The supporting surface 6' is therefore designed as circumferential ring surface and has a slope with respect to the axis of symmetry 21' of the housing 4. Because of corresponding constructive measures between the clamping surfaces 7', 8', and 9' of the clamping jaws 7, 8 and 9, the required tension effect develops, by means of which the workpiece 3 is pulled into the interior of the housing 4 and, secondly, because of the predetermined slope, the ring-shaped supporting surface 6' forms a stop for the pin receiving the workpiece 3 or for the workpiece 3 directly. The supporting surface 6' is directly a component of the housing 4.

The boreholes 11 are thereby either integrated in the supporting surface 6' and/or in the clamping surfaces 7', 8' and 9' of the three clamping jaws 7, 8 and 9 designated as clamping slides and the proximity sensors 12 respectively inserted into the boreholes 11 are facing the respective workpiece 3, so that, due to the proximity sensors 12 that are respectively used, the distance between said proximity sensors and the workpiece 3 in terms of their arrangement in the supporting surface 6' or in the clamping jaws 7, 8 and 9 is monitored and measured.

Figure 5:
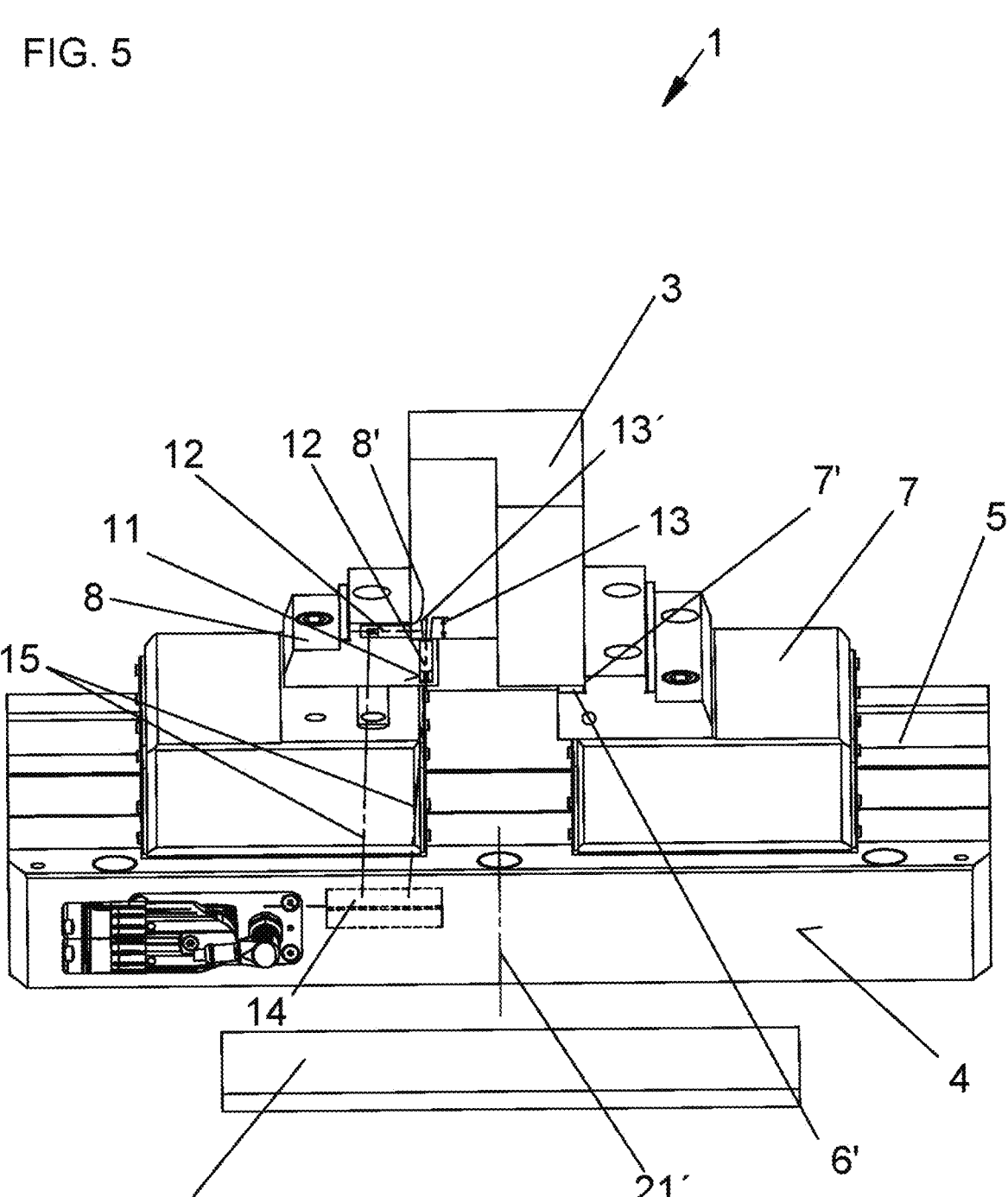

The clamping device 1 depicted in FIG. 5 is supposed to be designed and be usable as a vice having two clamping jaws 7 and 8 that are opposite from each other. The clamping jaws 7, 8 are mounted in the housing 4 so they are axially movable and can optionally be moved away from each other or towards each other in order to release or clamp the workpiece 3. The two clamping jaws 7, 8 normally move synchronously so that the workpiece 3 is oriented and held with a predetermined centering axis of the housing 4. However, it is also conceivable for one of the clamping jaws

8 to be designed as a stationary counter-stop and consequently be provided in a specific position on the housing 4. As a result, only the clamping jaw 7 opposite from it moves, and the workpiece 3 to be clamped is held between the clamping jaw 7 and the counter-stop 8.

It is also conceivable that the supporting surface 6', which is formed or made available by the housing 4, is allocated to the vice 1, so that the workpiece 3 to be clamped rests on thereon. The clamping jaws 7, 8 move at the same time and area a spaced apart from the supporting surface 6' of the vice 1, so that the workpiece 3 is fixed on the supporting surface 6' and between the clamping jaws 7, 8.

To check the correct distance between the workpiece 3 and the respective proximity sensors 12, the boreholes 11 are integrated both in the supporting surface 6' and/or in the clamping surfaces 7' and 8' or in the counter-stop 8 and point to the respective workpiece 3 to be held.

What is claimed is:

1. A clamping device (1) for holding a workpiece (3) to be machined by a machine tool (2), the clamping device comprising:
   a housing (4),
   a supporting element (6), which is a component of the housing (4) or is fastened thereto, and thereby forms a supporting surface (6'), on which the respective workpiece (3) rests during the machining process,
   at least one clamping jaw (7) that is mounted in the housing (4) so it is axially movable and a counter-stop formed by the housing (4) or an axially movable clamping jaw (8), between which the workpiece (3) is clamped in the region of the supporting surface (6') or at least three clamping jaws (7, 8, 9) mounted in the housing (4) so they are axially movable, between which the workpiece (3) is clamped in the region of the supporting surface (6'),
   wherein
   at least one free space (11) is integrated in the housing (4), the axis of symmetry of which runs perpendicular to the supporting surface (6') and which faces the clamped workpiece (3) with the open front side, and/or that at least one free space (11) is integrated in one of the clamping jaws (7, 8, 9), which free space leads to the clamping surface (7', 8', 9') associated with each of the clamping jaws (7, 8, 9),
   a proximity sensor (12) is inserted in the respective free space (11),
   and via the proximity sensor (12), a monitoring area (13) is formed between the supporting surface (6') and the workpiece (3), which is monitored by an analysis unit (14) with respect to the presence of the workpiece (3), characterized in that
   the distance of the free spaces (11) to a center point (21) of the housing (4) can be adjusted variably as a function of the diameter of the workpiece (3) to be machined.

2. The clamping device according to claim 1, characterized in that three free spaces (11) are arranged in the supporting surface (6') in a 120° separation angle to one another.

3. The clamping device according to claim 1, characterized in that the free spaces (11) in the supporting surface (6') are arranged in a circular path (20), which runs around the center point (21) of the housing (4).

4. The clamping device according claim 1, characterized in that one of the clamping jaws (7, 8 or 9) is arranged between two adjacent free spaces (11) in the supporting surface (6').

5. The clamping device according to claim 1, characterized in that the energy needed for the operation and/or the electrical signals required for the communication between the respective proximity sensor (12) and the analysis unit (14) are transmitted by means of an inductively operated interface (16), which is arranged in the housing (4) or outside of the housing (4).

6. The clamping device according to claim 1, characterized in that each of the proximity sensors (12) inserted in the free space (11) is attached to the analysis unit (14) by means of an electrical line (15) or an inductive interface (16).

7. The clamping device according to claim 6, characterized in that the analysis unit (14) is arranged on an axis of symmetry (21') of the housing (4) and that the electric lines (15) of the respective proximity sensors (21) are bundled at the analysis unit (14) and are guided outwardly therefrom in a bundled manner.

8. The clamping device according to claim 1, characterized in that that each of the proximity sensors (12) forms the monitoring area (13) of 0.02 mm to 3 mm and that the monitoring area (13) is designed as a field projecting perpendicularly from the supporting surface (6'), into which field the workpiece (3) to be clamped dips.

9. The clamping device according to claim 1, characterized in that the respective proximity sensor (12) is operated inductively, capacitively or light waves are emitted respectively to determine the distance.

* * * * *